United States Patent [19]

Kitazawa

[11] Patent Number: 4,952,954
[45] Date of Patent: Aug. 28, 1990

[54] MOTOR DRIVEN CAMERA

[75] Inventor: Toshiyuki Kitazawa, Tokyo, Japan

[73] Assignee: Asahi Kogaku Kogyo K.K., Tokyo, Japan

[21] Appl. No.: 307,492

[22] Filed: Feb. 8, 1989

[30] Foreign Application Priority Data

Feb. 9, 1988 [JP] Japan ................................. 63-16099

[51] Int. Cl.⁵ ............................................... G03B 1/12
[52] U.S. Cl. .................................................. 354/173.1
[58] Field of Search ......................... 354/173.1, 173.11

[56] References Cited

U.S. PATENT DOCUMENTS

| | | | |
|---|---|---|---|
| 4,444,482 | 4/1984 | Kobayashi | 354/173.1 |
| 4,671,636 | 6/1987 | Malloy Desormeaux | 354/173.1 X |
| 4,676,621 | 6/1987 | Malloy Desormeaux | 354/173.1 |
| 4,737,807 | 4/1988 | Takami et al. | 354/173.1 |

Primary Examiner—Michael L. Gellner
Attorney, Agent, or Firm—Sandler, Greenblum & Bernstein

[57] ABSTRACT

A motor driven camera having a back cover switch which is actuated when a back cover of a camera is closed and a winding-on mechanism which advances the film by a predetermined number of frames when the back cover switch is operated by the back cover, the improvement comprising a winding-on operation memory for memorizing the operation of the winding-on mechanism, a film detector for detecting the presence of film and a film idle-advancing device for advancing the film by a less number of frames only when the winding-on operation memorizing means memorizes the operation of the winding-on mechanism, when the film detector detects the presence of film and when the back cover switch is actuated by the back cover which is closed.

19 Claims, 8 Drawing Sheets

Fig_7

Fig. 8

MOTOR DRIVEN CAMERA

BACKGROUND OF THE INVENTION

1. Field of the Invention

The present invention relates to a motor driven camera, and more particularly, it relates to a control apparatus for a back cover switch which is actuated by a back cover of a camera and a film advancing mechanism which is in association with the back cover switch in a motor driven camera.

2. Description of Related Art

In a motor driven camera, a back cover switch which detects that the film back cover is closed and a winding-on means which is associated with the back cover switch to automatically wind a leading portion of a film by a predetermined number of frames (usually four or three frames) by a film winding mechanism when the back cover is closed are usually provided. However, the winding-on means operates to advance the film by four or three frames whenever the back cover is reopened and closed again, even if the film is already loaded. In such a case, where the film back cover is accidentally opened and closed again, it is not only unnecessary but also not advisable to advance the film by four or three frames which are the predetermined number of frames for the winding-on operation.

To solve this problem, a motor driven camera in which the winding-on mechanism does not operate when the back cover is accidentally opened after the film is loaded has been proposed. In the proposed camera, it is possible to prevent four or three frames of film from being wasted. However, in this camera, it is necessary for a photographer to advance the film one or two frames by operating the shutter when the back cover is accidentally opened. If a photographer fails to advance the film, one or two frames of film will have been exposed by the accidental opening of the back cover.

SUMMARY OF THE INVENTION

The primary object of the present invention is to provide a motor driven camera in which even if a back cover is accidentally opened and closed again after the film is loaded in the camera, a waste of an unnecessary number of frames of film can be avoided and in which when the back cover is closed, the camera is automatically brought into a position ready for photographing.

According to the present inventions the above-mentioned problem of the prior art can be eliminated by advancing the film by a less number of frames when the back cover is accidentally opened and closed again. Namely, in the present invention, the number of frames to be advanced for an initial winding-on operation is different from that when the back cover is accidentally opened after the film is loaded in the camera.

Figure 1A:
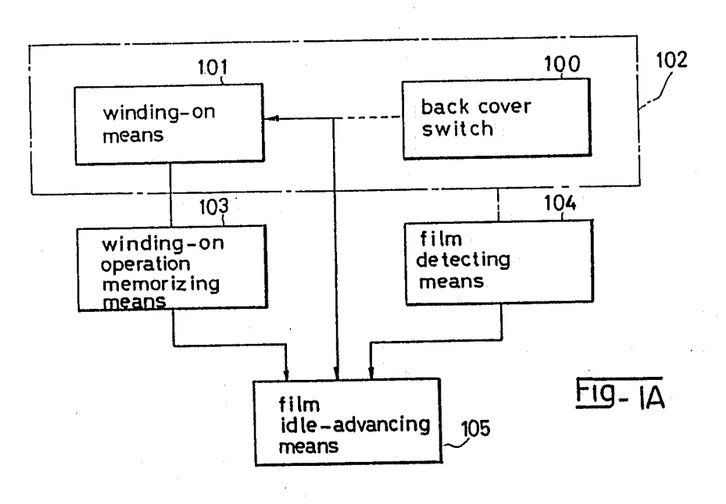
FIG. 1A is a block diagram showing a basic concept of the present invention.

To achieve the object mentioned above, according to the present invention, as shown in FIG. 1A, there is provided a motor driven camera with a back cover having a back cover switch 100 which is actuated by the opening and closing operations of the film back cover and a winding-on means 101 which advances the film by a predetermined number of frames when the back cover switch 100 is operated by the closing operation of the back cover, the improvement including winding-on operation memorizing means 103 for memorizing the operation of the winding-on mechanism 101, film detecting means 104 for detecting that the film is loaded in the camera and film idle-advancing means 105 for advancing the film by a less number of frames only when the winding-on operation memorizing means 103 memorizes the operation of the winding-on mechanism 101, the film detecting means 104 detects that the film is loaded int he camera and that the back cover switch 100 is actuated by the movement of the back cover from the open position to the closed position.

Preferably and practically, the number of frames of the film to be advanced by the film idle-advancing means is one or two.

BRIEF DESCRIPTION OF DRAWINGS

The invention will be described below in detail with reference to the accompanying drawings, in which.

DETAILED DESCRIPTION OF EMBODIMENTS

Figure 1B:
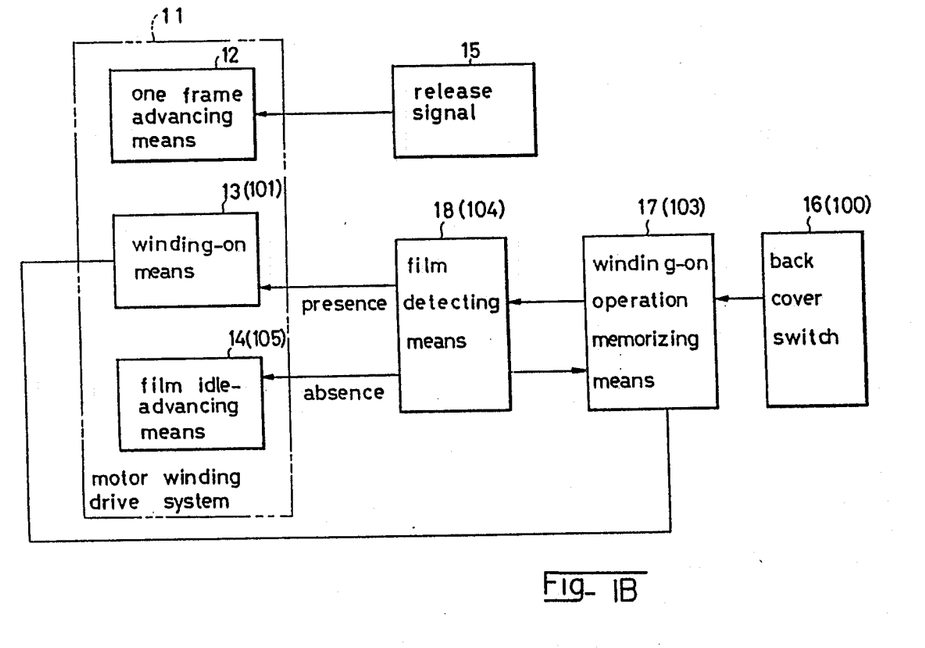
FIG. 1B is a block diagram of a motor driven camera according to one aspect of the present invention.

First, with reference to FIGS. 1A and 1B, a motor winding drive system 11 has a one frame advancing means 12 for advancing the film by one frame, a winding-on means 13(101) and a film indle-advancing means 14(105). Namely, the motor winding drive system 11 can advance the film by a desired number of frames in response to input signals thereto. In the illustrated embodiment, the number of frames of the film to be advanced by the one frame advancing means 12, by the winding-on means 13 and by the film idle-advancing means 14 are one, four and two, respectively.

The one frame advancing means 12 is activated in response to a shutter release signal 15. Conversely, the winding-on means 13 is activated when a back cover switch 16(100) is made ON. The operation of the winding-on means 13 is memorized by a winding-on operation memorizing means 17(103).

When the winding-on operation memorizing means 17 memorizes that the winding-on means 13 functions, and when a film detecting means 18(104) detects that the film is loaded in the camera, then if the back cover switch 16 is made ON, the film idle-advancing means 14 operates without the operation of the winding-on means 13.

Conversely, when the film detecting means 18 detects no film in the camera, then if the back cover switch 16 is made ON, the winding-on means 13 operates without the operation of the film idle-advancing means 14. This is because a microcomputer 25 incorporated in the camera does not perform predetermined sequential operations when the winding-on means 13 does not operate. Namely, regardless of the presence or absence of the film, when the back cover switch 16 is switched to ON from OFF, i.e., when the back cover is closed, a photographing operation, such as releasing the shutter without film in the camera can be effected.

Accordingly, when the film is loaded and when the back cover is accidentally opened and closed again after the winding-on operation in which the film is advanced by four frames is completed by the winding-on means 13, two frames of the film are automatically advanced by the film idle-advancing means 14 to be immediately ready for photographing.

It is noted that the film detecting means 18 resets the memory of the winding-on operation memorizing means 17 when the film is unloaded from the camera after the completion of photographing.

Figure 2:
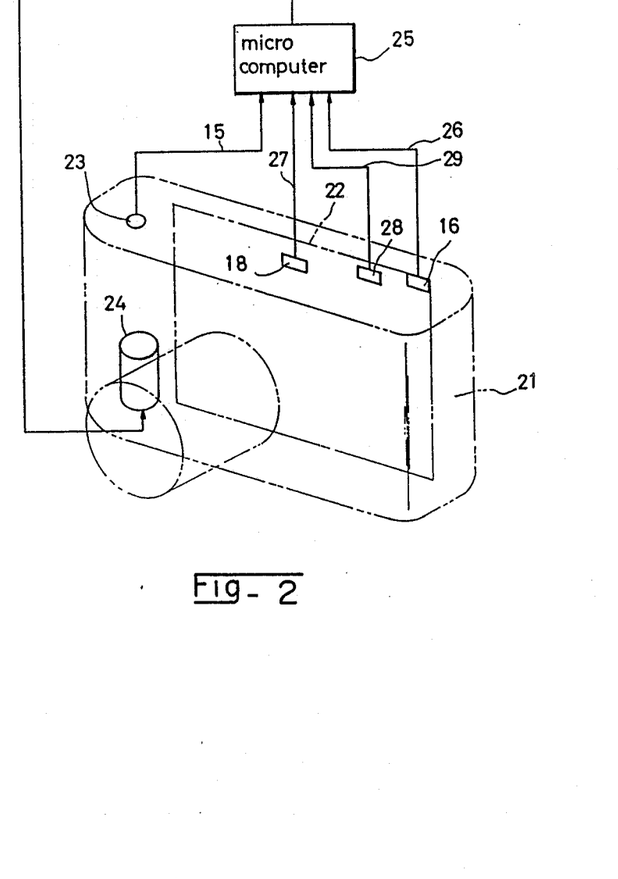
FIG. 2 is a schematic perspective view of a main construction of a motor driven camera according to one aspect of the present invention; and, FIGS. 3 through 8 are flow charts of the operations of a camera shown in FIG. 2.

The invention will be discussed below in more detail with reference to FIGS. 2 to 8. FIG. 2 shows an embodiment of motor driven camera according to the present invention, in which a camera body 21 has a back cover 22 capable of opening and closing, a back cover switch 16 which is made ON when the back cover 22 is closed, a film detecting switch 18 which is made ON to detect the presence of the film in the camera when the film is loaded in a film chamber of the camera and a motor 24 of the motor winding drive system 11. ON-OFF signal 26 of the back cover switch 16, ON-OFF signal 27 of the film detecting switch 18 and a release signal 15 of a release button 23 are input to the microcomputer 25 which includes a central processing unit (CPU), a program memory (ROM). a data memory (RAM). an interface (I/F) etc. The microcomputer 25 controls the motor 24 in response to those in signals. The microcomputer 25 also performs the automatic exposure AE and automatic focus AF controls in response to other input signals, which is are not the subject of the present invention. The camera body 21 also has a pulse generator 28 which detects the movement of the film to generate film advance confirmation pulses 29 which are input into the microcomputer 25.

Namely, the one frame advancing means 12, the winding-on means 13 and the film idle-advancing means 14, shown in FIG. 1B are controlled in association with a film driving system connected to the motor 24 by the control of the rotation of the motor 24 by the microcomputer 25. The one frame advancing means 1 in response to the shutter release signal 15. The the winding-on means 13 operates when the back cover switch 16 is made ON. The operation of the winding-on means 13 is memorized by the data memory which functions as the winding-on operation memorizing means 17 in the microcomputer 25. Preferably, the data memory can use a non-volatile memory, such as E$^2$PROM to prevent the memory of the operation of the winding-on means 13 from disappearing when a battery is exchanged. The microcomputer 25 operates the film idle-advancing means 14 without operating the winding-on means 13 when the back cover switch 16 is made ON from OFF, so long as the film detecting switch 18 detects the presence of the film and the winding-on operation is memorized in the data memory. If the film detecting switch 18 does not detect the presence of the film, the microcomputer 25 performs the winding-on function without performing the idle-advancing function.

The film detecting switch 18 can be formed, for example, by a switch which detects the presence of the film when it comes into contact with a patrone of the film or a DX code plate thereof.

FIGS. 3 through 8 show flow charts of the program (ROM memory) which are performed by the CPU in the microcomputer 25 to operate a motor driven camera according to an example of the present invention.

Figure 3:
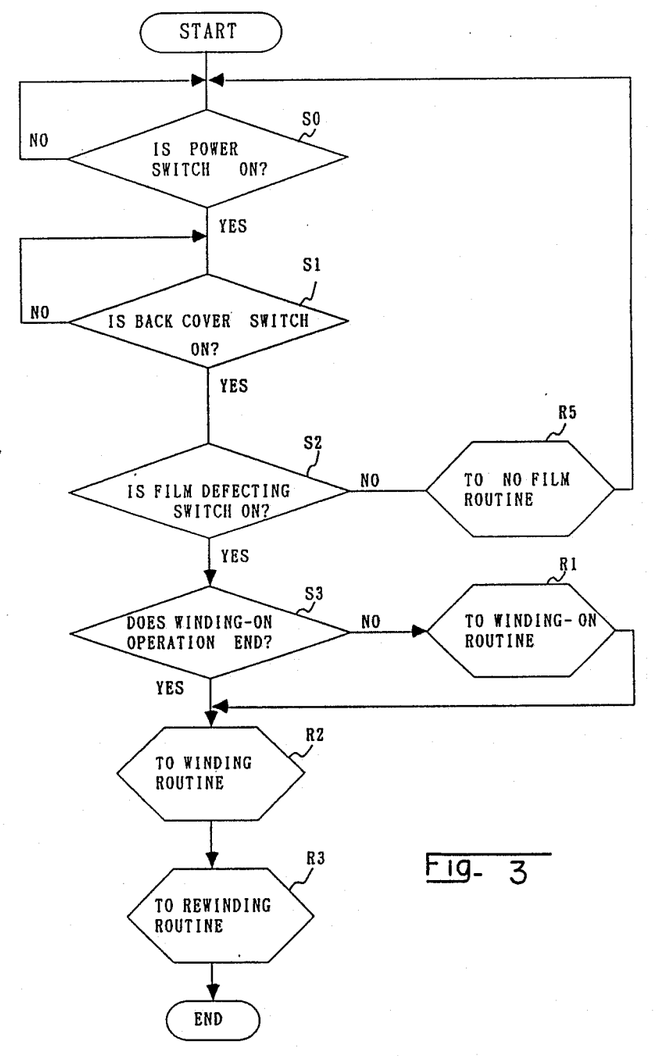

FIG. 3 shows a whole operation of the camera of the present invention. At steps S0, S1 and S2, whether the power switch is made ON, whether the back cover switch 16 is made ON and whether the film is loaded in the camera are checked, respectively. At step S2, if no film is loaded, the control proceeds to a no film routine R5. If the film is loaded, the control proceeds to step S3 at which whether the winding-on operation is completed is checked. If the winding-on operation is not completed, the control proceeds to a winding-on routine R1. If the winding-on operation is completed at step S3, the control proceeds to a winding routine R2 and then to a rewinding routine R3 to detect the terminal end of the film.

Figure 4:
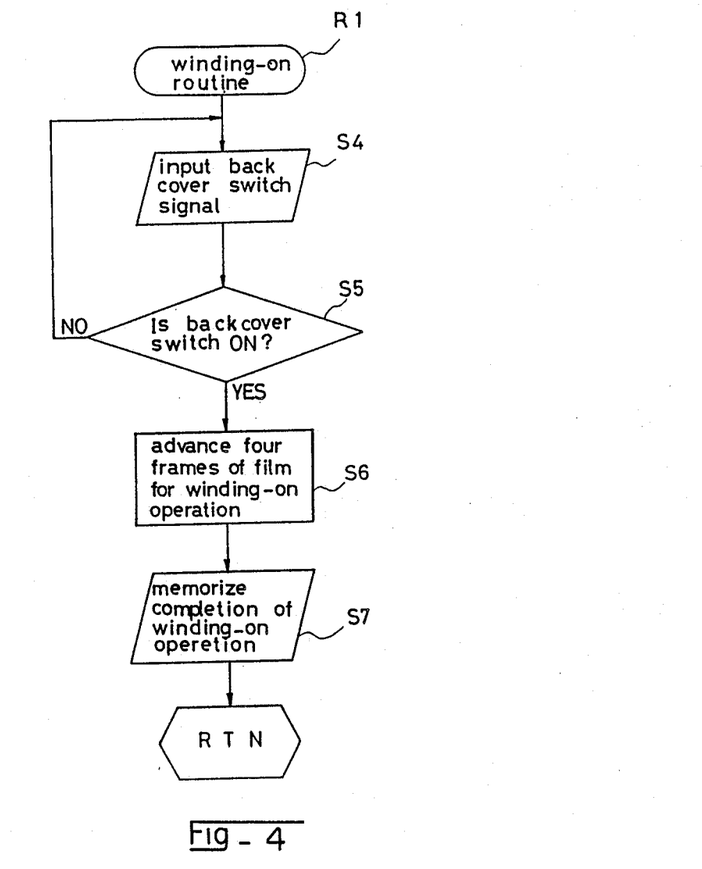

In the winding-on routine R1, at step S4 shown in FIG. 4, the back cover switch signal is input to the microcomputer. After that, at step S5, whether the back cover switch is made ON is checked. If the back cover is closed, the control proceeds to step S6 at which the film is advanced by four (or three) frames by the winding-on means 13. After that, the completion of the winding-on operation is memorized in the data memory at step S7. Note that the shutter does not operated during the winding-on operation.

Figure 5:
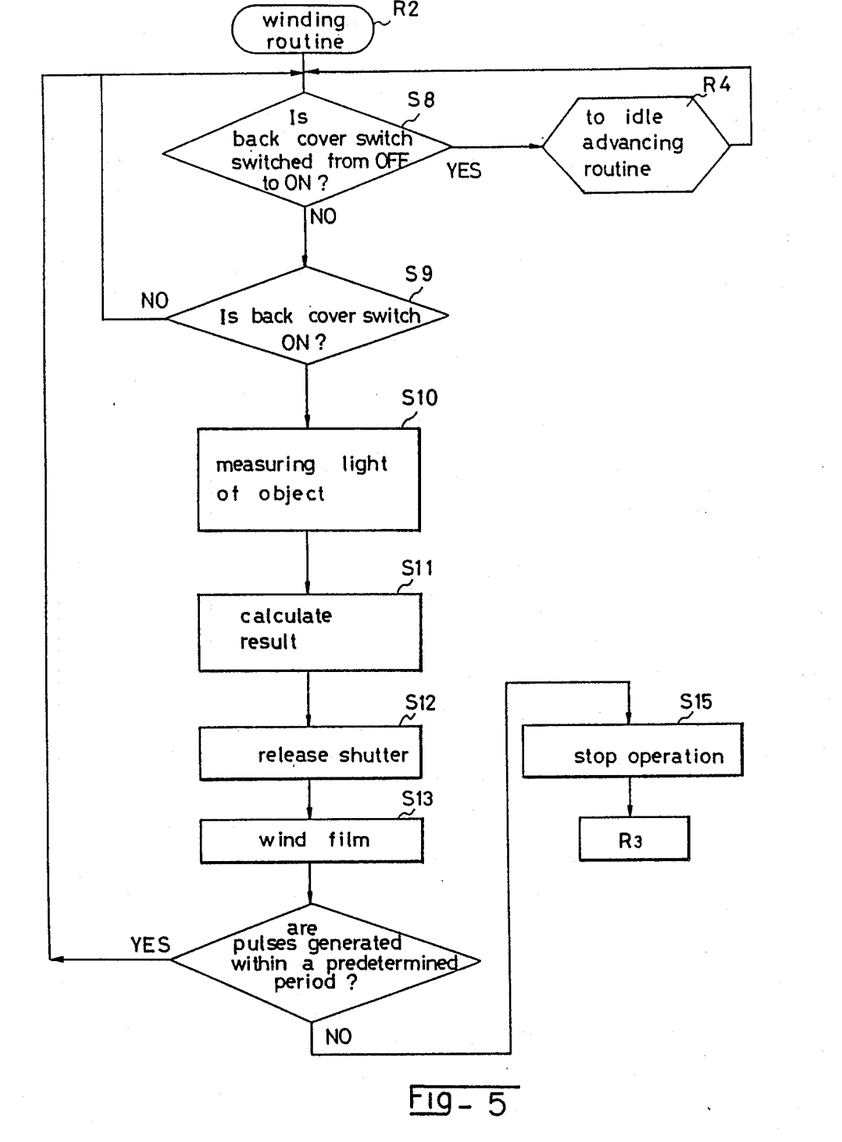

In the winding routine R2 shown in FIG. 5, whether the back cover switch 16 is switched from OFF to ON is checked, that is, whether the back cover is accidentally reopened and closed again is checked at step S8. If the back cover is reopened and closed again, the control proceeds to an idle-advancing routine R4. If the back cover is not reopened, the control proceeds to step S10 for the measuring light of the object, then to step S11 for the calculation of the exposure value, and to step S12 for the release operation. When the release operation ends, one frame of the film is wound by the one frame advancing means 12 at step S13. After that, whether the film winding is performed, i.e. whether the film advancing confirmation pulses 29 is generated by the pulse generator 28 is checked at step S14. If the film is advanced by one frame at step S14, the control is returned to step S8 to repeat the operations mentioned above. Reversely, if no advance of film takes place, i.e. if the terminal end of the film is detected, the control proceeds to step S15 at which the operation is stopped. After that, the control proceeds to the rewinding routine R3.

Figure 6:
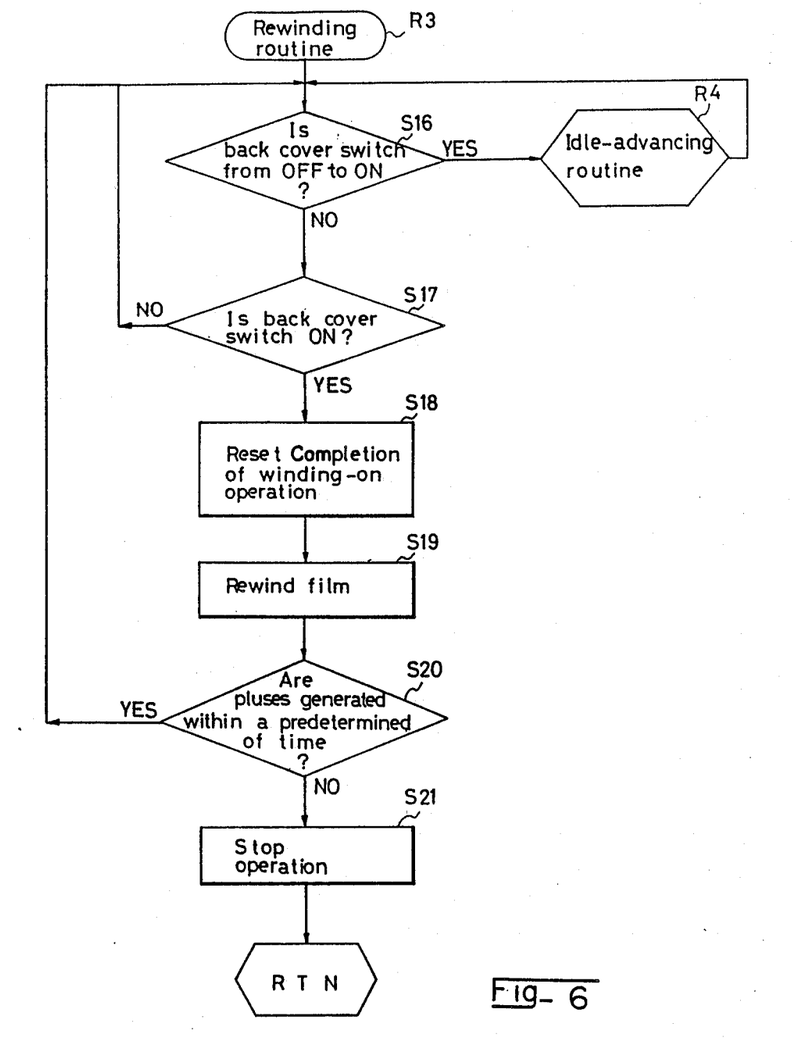

In the rewinding routine R3 shown in FIG. 6, whether the back cover switch 16 is switched from OFF to ON, that is, whether the back cover is accidentally reopened and closed again is checked at step S16. If the back cover is reopened, the control proceeds to the idle-advancing routine R4. Reversely, if the back cover is not reopened, whether the back cover is still closed is checked at step S17. If the back cover is still closed, the control proceeds to step S18 at which the completion of the winding-on operation is reset. After that, the film is rewound at step S19. At step S20, whether the rewinding of the film is completed, that is, whether no pulse 29 is generated by the pulse generator is checked. If no pulse is generated, the operation is stopped at step S21. On the contrary, if the film is being rewound at step S20, the control is returned to step S16.

Figure 7:
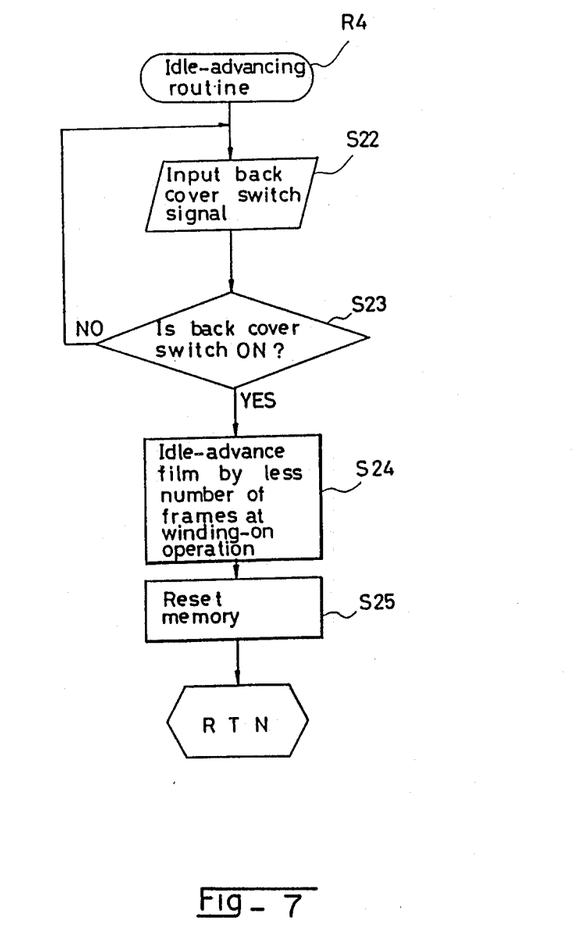

In the idle-advancing routine R4 shown in FIG. 7, at step S22, the back cover switch signal is input to the microcomputer and then, whether the back cover switch is made ON is checked at step S23. If the back cover is closed, two frames of film are advanced by the film idle-advancing means 14 at step S24. When the idle-advancing of the film is completed, the data concerning the memory of the winding-on operation are reset. Namely, since the switching operation of the back cover switch 16 from OFF to ON is reset, even if the back cover is reopened twice or more in one film, the same idle-advancing operations of two frames of film are effected.

Figure 8:
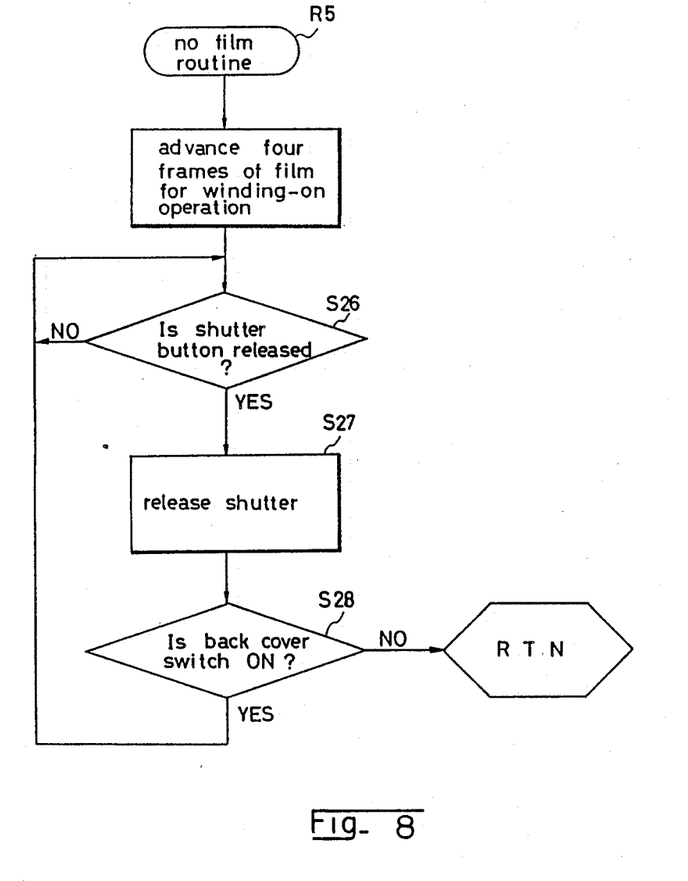

In the no-film routine R5 shown in FIG. 8, whether the shutter button is released is checked at step S26. If the shutter release is effected, the idle release operation is effected at step S27. After that, whether the back cover is made ON is checked at step S28. If the back cover switch is made ON, the control is returned to step S26. If the back cover switch is not made ON, the control is returned to the start in FIG. 3.

As can be understood from the above discussion, according to the present invention, if the back cover is accidentally reopened after the film is loaded in the camera, the film is advanced by a less number of frames than the number of frames which are to be advanced upon winding-on operation without operating the winding-on means, and accordingly, the number of frames of film which are inevitably wasted can be decreased. Furthermore, according to the present invention, an automatic photographing can be effected after the back cover is closed again.

I claim:

1. A motor driven camera with a back cover switch which is actuated by the opening and closing operations of a film back cover of a camera and a winding-on means which advances the film by a predetermined number of frames when the back cover switch is operated by the closing operation of the back cover, the improvement comprising winding-on operation memorizing means for memorizing the operation of the winding-on means, film detecting means for detecting that the film is loaded in the camera and film idle-advancing means for advancing the film by a number of frames less than by the winding-on means only when the winding-on operation memorizing means memorizes the operation of the winding-on mechanism, when the film detecting means detects that the film is loaded in the camera and when the back cover switch is actuated by the movement of the back cover from the open position to the closed position.

2. A motor driven camera according to claim 1, wherein the number of frames of the film to be advanced by the idle-advancing means is one.

3. A motor driven camera according to claim 1, wherein the number of frames of the film to be advanced by the idle-advancing means is two.

4. A motor driven camera according to claim 1, wherein the number of frames of the film to be advanced by the winding-on means is three.

5. A motor driven camera according to claim 1, wherein the number of frames of the film to be advanced by the winding-on means is four.

6. A motor driven camera according to claim 1, wherein the winding-on operation memorizing means have E$^2$PROM.

7. A motor driven camera according to claim 1, wherein the memory of the winding-on operation memorizing means is reset by the film detecting means when the film is unloaded from the camera.

8. A motor driven camera according to claim 1, wherein said winding-on means and said idle-advancing means each advance the film in the same direction.

9. A motor driven camera with a back cover on which a back cover switch is provided to detect the closure of the back cover, and having a winding-on means which advances a film loaded in the camera by two or more frames when the back cover switch is made ON by the closure of the back cover, the improvement comprising means for advancing the film by a number of frames less than the number of frames to be advanced by the winding-on means without operating the winding-on means when the back cover is reopened after the film is loaded in the camera and for minimizing wasting of unexposed frames of film.

10. A motor driven camera according to claim 9, wherein said winding-on means and said means for advancing each advance the film in the same direction.

11. A motor driven camera having a motor winding drive system which advances a film, in which said motor winding driving system has a one frame advancing means for advancing the film by one frame, a winding-on means for advancing the film by predetermined number of frames when a back cover of a camera is closed and a film advancing means for advancing the film by predetermined number of frames when the back cover is closed after the cover is accidentally opened under the condition in which the film is loaded.

12. A motor driven camera according to claim 11, wherein the number of frames of the film to be advanced by the film advancing means is less than that of the winding-on means.

13. A motor driven camera according to claim 11, wherein said winding-on means and said film advancing means each advance said film in the same direction.

14. A method of advancing film in a camera having a back cover, a back cover switch, and a winding-on means for advancing the film, comprising the steps of:
(a) advancing the film by a predetermined number of frames when the film is loaded into the camera and the back cover switch is made ON by the closure of the back cover; and
(b) advancing the film by a number of frames less than the predetermined number when the back cover is reopened after the film is loaded into the camera and the back cover is reclosed.

15. The method of advancing film in a camera according to claim 14, wherein the predetermined number of frames is four.

16. The method for advancing film in a camera according to claim 14, wherein the predetermined number of frames is three.

17. The method for advancing film in a camera according to claim 14, and further comprising memorizing the operation of the winding-on means when film is loaded into the camera.

18. The method for advancing film in a camera according to claim 17, and further advancing the film by an idle-advancing means when the back cover is reopened and then closed after the operation of the winding-on means had been memorized.

19. A method of film advancing according to claim 14, wherein each of said advancing steps comprises advancing the film in the same direction.

* * * * *

UNITED STATES PATENT AND TRADEMARK OFFICE
CERTIFICATE OF CORRECTION

PATENT NO. : 4,952,954

DATED : August 28, 1990

INVENTOR(S) : T. KITAZAWA

It is certified that error appears in the above-identified patent and that said Letters Patent is hereby corrected as shown below:

```
Column 1, line 48, change "inventions" to ---invention,--

Column 2, line 5, change "int he" to ---in the---.
Column 2, line 28, change "one frame" to ---one-frame---.
Column 2, line 30, change "indle-advancing" to ---idle-
  advancing--.
Column 2, line 35, change "one frame" to ---one-frame---.
Column 2, line 38, change "one frame" to ---one-frame---.
Column 3, line 9, insert ---a--- after "of".
Column 3, line 21, change "." after "(ROM)" to ---,---.
Column 3, line 22, change "." after "(RAM)" to ---,---.
Column 3, line 22, insert ---,--- after "(I/F)".
Column 3, line 23, change "in" before "signals" to ---
  input--.
Column 3, lines 24-25, change "automatic exposure AE and
  automatic focus AF" to ---AE (automatic exposure) and AF
  (automatic focus)--.
Column 3, line 26, delete "is".
Column 3, line 31, change "one frame" to ---one-frame---.
Column 3, line 36, change "one frame" to ---one-frame---.
Column 3, line 36, change "1" to ---12 operates---.
Column 3, line 37, change "The the" to ---The---.
Column 3, line 63, change "a" to ---the---.
Column 3, line 68, change "no film" to ---no-film---.
Column 4, line 17, change "Note" to ---It is noted---.
Column 4, line 17, change "operated" to ---operate---.
Column 4, line 37, change "Reversely" to ---Conversely---
Column 4, line 47, change "Reversely" to --conversely--.
Column 5, line 16, after "upon" insert ---the---.
Column 5, line 19, delete "an".
```

UNITED STATES PATENT AND TRADEMARK OFFICE
CERTIFICATE OF CORRECTION

PATENT NO. : 4,952,954

DATED : August 28, 1990

INVENTOR(S) : T. KITAZAWA

It is certified that error appears in the above-identified patent and that said Letters Patent is hereby corrected as shown below: Column 5, line 36, change "mechanism" to --means--.

Column 6, line 18 (line 3 of claim 11), change "one frame" to ---one-frame---.

Column 6, line 20 (line 5 of claim 11), insert ---a--- after "by".

Column 6, line 23 (line 8 of claim 11), insert ---a--- after "by".

Column 6, line 28 (line 3 of claim 12), change "of" to ---by---.

Signed and Sealed this

Twenty-fifth Day of May, 1993

Attest:

MICHAEL K. KIRK

Attesting Officer

Acting Commissioner of Patents and Trademarks